United States Patent Office 3,531,474
Patented Sept. 29, 1970

1

3,531,474
BRIDGED BENZODIAZEPINONES
Hans Ott, Convent Station, N.J., assignor to Sandoz-Wander, Inc., Hanover, N.J.
No Drawing. Original application Dec. 9, 1966, Ser. No. 600,404, now Patent No. 3,480,629, dated Nov. 25, 1969. Divided and this application May 14, 1969, Ser. No. 842,755
Int. Cl. C07d 53/06
U.S. Cl. 260—239.3          2 Claims

ABSTRACT OF THE DISCLOSURE

Disclosed are 1,4-methano bridged 5-phenyl-benzodiazepin-2-ones, and process for preparation involving the intermediates which are 3-carbalkoxymethyl-4-phenyl-3,4-dihydroquinazolines, 3-carboxymethyl-4-phenyl-3,4-dihydroquinazolines and 3-carboxymethyl-4-phenyl-1,2,3,4-tetrahydroquinazolines. These 1,4-methano bridged 5-phenyl-benzodiazepin-2-ones are useful as tranquilizers.

This application is a division of Ser. No. 600,404, filed Dec. 9, 1966, now U.S. Pat. No. 3,480,629.

This invention relates to heterocyclic compounds. In particular, the invention pertains to bridged benzodiazepinones and a process for preparing the same. The invention also relates to intermediates which are useful in preparing the above compounds and processes for preparing said intermediates.

The benzodiazepinones of the present invention may be represented structurally as follows:

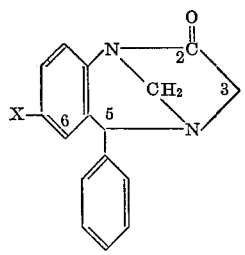

I wherein X represents hydrogen, chloro, bromo or nitro.

The compounds of structural Formula I are prepared by reacting 4-phenyl-3,4-dihydroquinazoline or an appropriately substituted derivative thereof with an alkyl haloacetate to form the corresponding 3-carbalkoxymethyl-4-phenyl-3,4-dihydroquinazoline, converting the latter to the corresponding 3-carboxymethyl-4-phenyl-3,4-dihydroquinazoline, reducing the latter to the corresponding 3 - carboxymethyl-4-phenyl-1,2,3,4-tetrahydroquinazoline and dehydrating the latter. This process may be illustrated as follows:

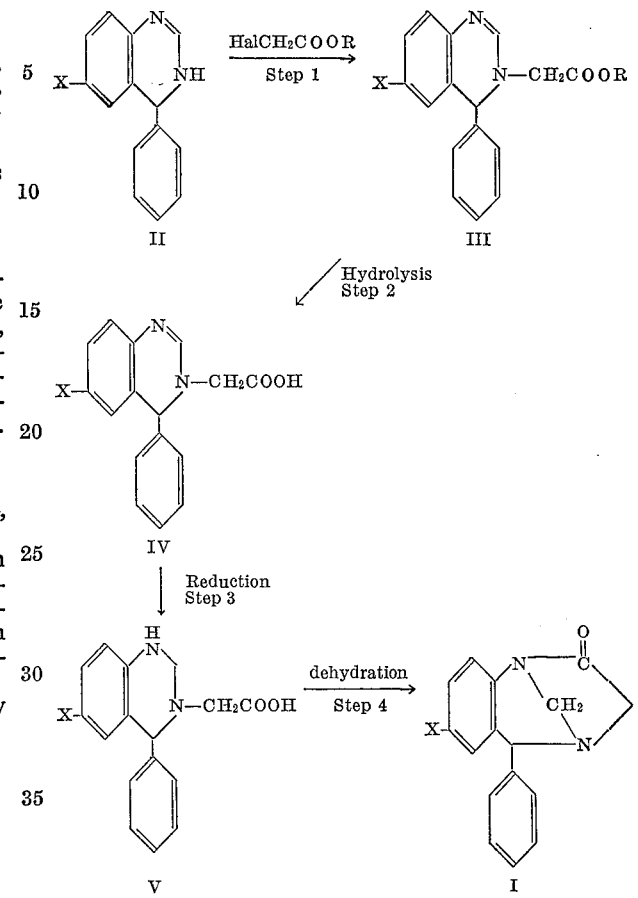

wherein

X is as previously defined,
Hal represents chloro or bromo (preferably bromo) and
R represents alkyl, desirably lower alkyl containing from 1 to 4 carbon atoms, e.g., methyl, ethyl, propyl and butyl, and preferably methyl or ethyl.

Step 1 of the above process is conveniently carried out in an inert organic solvent, e.g., methanol, ethanol, dioxane and tetrahydrofuran, and at elevated temperatures, preferably reflux temperature. In carrying out the reaction it is desirable to provide a means for taking up the liberated hydrogen halide. This can be accomplished by carrying out the reaction in the presence of a tertiary amine, e.g., pyridine, tertiary butylamine and triethylamine.

In Step 2 of the process a 3-carbalkoxymethyl-4-phenyl-3,4-dihydroquinazoline (III) is hydrolyzed to the corresponding 3-carboxymethyl derivative (IV). The hydrolysis is readily carried out in an aqueous inert organic solvent at room temperature or elevated temperatures, and in the presence of a strong base. The organic solvent is desirably one which is water-miscible, e.g., methanol, ethanol, propanol, dioxane, acetone and tetrahydrofuran, and the base is preferably an alkali metal hydroxide, e.g., sodium hydroxide, potassium hydroxide and lithium hydroxide, although other strong bases, such as barium hydroxide can also be used.

Conversion of the 3,4-dihydroquinazoline derivative (IV) to the corresponding 1,2,3,4-tetrahydroquinazoline derivative (V) (Step 3) is effected by chemical reduction employing a borohydride, e.g., sodium borohydride, as the reducing agent. The reduction is conveniently carried out in an inert organic solvent, e.g., methanol, ethanol, dioxane and tetrahydrofuran, and at room temperature or elevated temperatures up to reflux temperature.

In the last step of the process (Step 4) the 1,2,3,4-tetrahydroquinazoline (V) is converted to the desired bridged benzodiazepinone (I) by dehydration. The dehydration can be readily effected employing dehydrating agents conventionally used to bring about ring closure, e.g., thionyl chloride, phosphorus pentachloride and the like. However, the preferred dehydrating agents are the lower alkyl halocarbonates, e.g., ethyl chlorocarbonate. The dehydration is carried out in an inert organic solvent, e.g., dioxane and at room temperature, preferably in the presence of a tertiary amine base, such as triethylamine and tertiary butylamine.

Various of the starting compounds employed in the above process are known and can be prepared as described in the literature. Such others which are not specifically known can be prepared from available materials in analogous manner.

The compounds of structural Formula I are useful because they possess pharmacological activity in animals. In particular, the compounds are central nervous system depressants and can be used as tranquilizers. For such usage the compounds may be admixed with conventional pharmaceutical carriers, and other adjuvants, if necessary, and administered orally in such forms as tablets, capsules, elixirs, suspensions and the like or parenterally in the form of an injectable solution or suspension. The dosage employed will, of course, vary depending upon the compound used and mode of administration. However, in general, satisfactory results are obtained when administered at a daily dosage of from about 10 milligrams per kilogram of body weight to about 30 milligrams per kilogram of body weight preferably given in divided doses, 2 to 4 times a day, or in sustained release form. For both large mammals and small domestic mammals the daily dosage is generally from about 1000 milligrams to about 3000 milligrams, and the preferred dosage forms comprise from about 250 milligrams to about 750 milligrams of the compound admixed with a solid or liquid pharmaceutical carrier or diluent. A representative formulation is a tablet prepared by standard tabletting techniques and containing the following ingredients:

| Ingredient: | Parts by weight |
|---|---|
| 7 - chloro - 5 - phenyl - 1,4 - dihydro - 5H - 1,4 - methano - 1,4 - benzodiazepin-2(3H)-one | 50 |
| Tragacanth | 2 |
| Lactose | 39.5 |
| Corn starch | 5 |
| Talcum | 3 |
| Magnesium stearate | 0.5 |

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

7-chloro-5-phenyl-1,4-dihydro-5H-1,4-methano-1,4-benzodiazepin-2(3H)-one

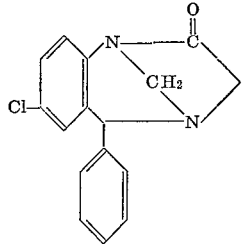

Step A: Preparation of 3-carbethoxymethyl-6-chloro-4-phenyl-3,4-dihydroquinazoline.—A mixture of 7 g. of 6-chloro-4-phenyl-3,4-dihydroquinazoline, 7 ml. of triethylamine, 4.1 g. of ethylbromoacetate and 70 ml. of ethanol is refluxed for 1½ hours and then evaporated to dryness. The residue is added to a mixture of 100 ml. of methylene chloride and 100 ml. of water, the resulting mixture shaken and the organic phase separated, dried over anhydrous sodium sulfate and evaporated in vacuo to obtain 3-carbethoxymethyl-6-chloro-4 - phenyl - 3,4 - dihydroquinazoline as an oil.

Step B: Preparation of 3-carboxymethyl-6-chloro-4-phenyl-3,4-dihydroquinazoline.—A mixture of 8 g. of 3-carbethoxymethyl - 6 - chloro - 4 - phenyl-3,4-dihydroquinazoline, 100 ml. of ethanol and 45 ml. of 2 N sodium hydroxide is heated at 60° C. for 1½ hours and then concentrated in vacuo to about 50 ml. The resulting concentrate is then diluted with 100 ml. of water and then extracted twice with 50 ml. (each) of ethyl acetate and then neutralized with hydrochloric acid to pH 6–7. The resulting mixture is then extracted three times with 50 ml. (each) of methylene chloride. The combined organic phases are then dried over anhydrous sodium sulfate and then evaporated to obtain 3-carboxymethyl - 6 - chloro-4-phenyl - 3,4 - dihydroquinazoline as an oil.

Step C: Preparation of 3 - carboxymethyl-6-chloro-4-phenyl-1,2,3,4-tetrahydroquinazoline.—To a mixture of 5 g. of 3-carboxymethyl-6-chloro-4-phenyl - 3,4 - dihydroquinazoline, 70 ml. of ethanol and 20 ml. of 2 N sodium hydroxide is added, at 60° C., 2 g. of sodium borohydride in several portions. The resulting mixture is heated at 60° C. for 1½ hours, then cooled and the excess borohydride decomposed by the careful addition of 60 ml. of 2 N hydrochloric acid. The resulting mixture is then evaporated in vacuo to remove most of the ethanol and the residual mixture neutralized to pH 6 with sodium hydroxide and then extracted three times with an equal volume (each) of methylene chloride. The combined extracts are then dried over anhydrous sodium sulfate and evaporated to obtain 3-carboxymethyl-6-chloro-4-phenyl-1,2,3,4-tetrahydroquinazoline as a foam.

Step D: Preparation of 7-chloro-5-phenyl-1,4-dihydro-5H-1,4-methano-1,4-benzodiazepin-2(3H)-one.—To a solution of 3.65 g. of 3-carboxymethyl-6-chloro-4-phenyl-1,2,3,4-tetrahydroquinazoline in 50 ml. of dry dioxane is added, dropwise and at 10° C., 2 ml. of ethyl chlorocarbonate. The resulting mixture is allowed to stand at room temperature for 15 minutes and the dioxane is then evaporated off in vacuo at 30–35° C. The residue is dissolved in 50 ml. of methylene chloride and the resulting solution extracted with 50 ml. of 0.5 N sodium bicarbonate solution. The organic phase is dried over anhydrous sodium sulfate and evaporated to dryness in vacuo. The residue is recrystallized from diethyl ether to obtain 7-chloro-5-phenyl-1,4-dihydro-5H-1,4-methano - 1,4 - benzodiazepin-2(3H)-one, M.P. 150–152° C.

EXAMPLE 2

Following the procedure of Step A of Example 1 and employing an equivalent amount of the 3,4-dihydroquinazolines enumerated below in place of the 6-chloro-4- phenyl-3,4-dihydroquinazoline employed therein, there are obtained the products set forth below:

Dihydroquinazoline:  Product
(a) 4-phenyl-3,4-dihydroquinazoline  ——— 3-carbethoxymethyl-4-phenyl-3,4-dihydroquinazoline.
(b) 6-bromo-4-phenyl-3,4-dihydroquinazoline ———— 6-bromo-3-carbethoxymethyl-4-phenyl-3,4-dihydroquinazoline.
(c) 6-nitro-4-phenyl-3,4-dihydroquinazoline ———— 3-carbethoxymethyl-6-nitro-4-phenyl-3,4-dihydroquinazoline.

EXAMPLE 3

Following the procedure of Step B of Example 1 and employing an equivalent amount of the products of Example 2 in place of the 3-carbethoxymethyl-6-chloro-4-phenyl-3,4-dihydroquinazoline employed therein, there are obtained the compounds set forth below:

(a) 3-carboxymethyl-4-phenyl-3,4-dihydroquinazoline
(b) 6-bromo-3-carboxymethyl-4-phenyl-3,4-dihydroquinazoline
(c) 3-carboxymethyl-6-nitro-4-phenyl-3,4-dihydroquinazoline

EXAMPLE 4

Following the procedure of Step C of Example 1 and employing an equivalent amount of the compounds of Example 3 in place of the 3-carboxymethyl-6-chloro-4-phenyl-3,4-dihydroquinazoline used therein, there are obtained the following tetrahydroquinazolines:

(a) 3-carboxymethyl-4-phenyl-1,2,3,4-tetrahydroquinazoline
(b) 6-bromo-3-carboxymethyl-4-phenyl-1,2,3,4-tetrahydroquinazoline
(c) 3-carboxymethyl-6-nitro-4-phenyl-1,2,3,4-tetrahydroquinazoline

EXAMPLE 5

Following the procedure of Step D of Example 1 and employing an equivalent amount of the tetrahydroquinazolines of Example 4 in place of the 3-carboxymethyl-6-chloro-4-phenyl-1,2,3,4-tetrahydroquinazoline used therein, there are obtained the benzodiazepinones set forth below:

(a) 5-phenyl-1,4-dihydro-5H-1,4-methano-1,4-benzodiazepin-2(3H)-one
(b) 7-bromo-5-phenyl-1,4-dihydro-5H-1,4-methano-1,4-benzodiazepin-2(3H)-one
(c) 7-nitro-5-phenyl-1,4-dihydro-5H-1,4-methano-1,4-benzodiazepin-2(3H)-one

What is claimed is:
1. A compound of the formula

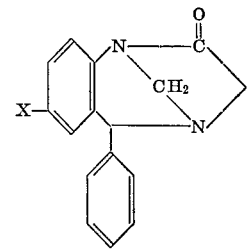

wherein X represents hydrogen, chloro, bromo or nitro.

2. The compound of claim 1 which is 7-chloro-5-phenyl-1,4-dihydro-5H-1,4-methano-1,4-benzodiazepin-2(3H)-one.

No references cited.

HENRY R. JILES, Primary Examiner

R. T. BOND, Assistant Examiner

U.S. Cl. X.R.
424—24.4